(12) United States Patent
Tyson et al.

(10) Patent No.: US 10,223,605 B2
(45) Date of Patent: Mar. 5, 2019

(54) INTERACTIVE VIRTUAL AQUARIUM SIMULATION SYSTEM AND ASSOCIATED METHODS

(71) Applicant: Colorvision International, Inc., Orlando, FL (US)

(72) Inventors: Henry Tyson, Orlando, FL (US); Bryan Wilkins, Orlando, FL (US); James William Guy, Orlando, FL (US); Mark Simmons, Orlando, FL (US)

(73) Assignee: COLORVISION INTERNATIONAL, INC., Orlando, FL (US)

( * ) Notice: Subject to any disclaimer, the term of this patent is extended or adjusted under 35 U.S.C. 154(b) by 19 days.

(21) Appl. No.: 15/073,860

(22) Filed: Mar. 18, 2016

(65) Prior Publication Data
US 2017/0270712 A1    Sep. 21, 2017

(51) Int. Cl.
| | | |
|---|---|---|
| *G06T 19/00* | (2011.01) | |
| *G06K 9/18* | (2006.01) | |
| *A63F 13/00* | (2014.01) | |
| *A63F 9/24* | (2006.01) | |
| *H04N 1/00* | (2006.01) | |
| *H04L 29/06* | (2006.01) | |

(52) U.S. Cl.
CPC ............. *G06K 9/18* (2013.01); *A63F 9/24* (2013.01); *A63F 13/00* (2013.01); *H04L 67/38* (2013.01); *H04N 1/00* (2013.01)

(58) Field of Classification Search
CPC ..... G06T 19/006; G06T 15/20; G06T 19/003; G06T 19/20; G06T 2215/16; G06T 17/00; G06T 2200/04; G06T 13/40; G06T 15/00; G06F 3/04815; G06F 3/012; G06F 3/011
USPC .................................. 345/419, 473
See application file for complete search history.

(56) References Cited

U.S. PATENT DOCUMENTS

| | | | |
|---|---|---|---|
| 6,507,353 B1* | 1/2003 | Huard ............ | G09B 19/00 345/419 |
| 6,774,900 B1* | 8/2004 | Kubota ............ | A63F 13/08 345/473 |
| 9,101,837 B1* | 8/2015 | Snyder ............ | G06F 19/3481 |
| 2003/0008756 A1 | 1/2003 | Pino | |

(Continued)

OTHER PUBLICATIONS

"The Computer Museum, Boston" Wikipedia https://en.wikipedia.org/wiki/the_computer_museum,_boston; retrieved from internet Mar. 16, 2016; pp. 9.

*Primary Examiner* — Kimbinh T Nguyen
(74) *Attorney, Agent, or Firm* — Allen, Dyer, Doppelt & Gilchrist, P.A.

(57) ABSTRACT

An interactive virtual aquarium simulation system includes a two-dimensional (2D) fish image having a unique identifier associated therewith, with the unique identifier corresponding to predefined fish movements. A scanner scans the 2D fish image and converts to a digital image. A three-dimensional (3D) mapping processor is coupled to the scanner to generate a 3D fish image based on the digital image. A virtual simulation processor is coupled to the 3D mapping processor to generate simulation video of a virtual aquarium including a plurality of fish and the 3D fish image. The 3D fish image swims within the virtual aquarium based on the predefined fish movements. The simulation video of the virtual aquarium with the 3D fish image is provided to a display.

24 Claims, 9 Drawing Sheets

(56) References Cited

U.S. PATENT DOCUMENTS

| | | | |
|---|---|---|---|
| 2004/0204127 A1* | 10/2004 | Forlines | H04M 1/72544 |
| | | | 455/566 |
| 2008/0148610 A1 | 6/2008 | Zhu et al. | |
| 2014/0333612 A1* | 11/2014 | Itoh | G09G 3/003 |
| | | | 345/419 |
| 2015/0130790 A1* | 5/2015 | Vasquez, II | G06T 19/006 |
| | | | 345/419 |
| 2015/0243062 A1 | 8/2015 | Tyson et al. | |
| 2016/0151705 A1* | 6/2016 | Ji | H04N 21/4223 |
| | | | 463/29 |

* cited by examiner

INTERACTIVE VIRTUAL AQUARIUM SIMULATION SYSTEM AND ASSOCIATED METHODS

FIELD OF THE INVENTION

The present invention relates to virtual simulation systems, and more particularly, to an interactive virtual aquarium simulation system and associated methods.

BACKGROUND OF THE INVENTION

Virtual simulation systems use three-dimensional (3D) objects and environments to create immersive and engaging learning experiences. Virtual simulations may be used in a variety of different contexts, such as marine and animal life, for example.

The Virtual FishTank™ at the Computer Museum in Boston, Mass. is one example of a virtual undersea simulation. Visitors create virtual cartoon-like fish, give them particular features and characteristics, release their fish into the simulated fish tank, and observe the behavior of their fish based on the selected features and characteristics. The schooling effect is also demonstrated. A special station, in front of a window to the virtual aquarium, allows the fish to detect the presence of a viewer carrying sensors and, via a digital video camera, react to the viewer's movements. Even in view of the Virtual FishTank™, there is still a need to enhance visitors' experiences with virtual simulations.

SUMMARY OF THE INVENTION

An interactive virtual aquarium simulation system comprises a two-dimensional (2D) fish image having a unique identifier associated therewith, with the unique identifier corresponding to predefined fish movements. A scanner may scan the 2D fish image and convert to a digital image. A three-dimensional (3D) mapping processor may be coupled to the scanner to generate a 3D fish image based on the digital image. A virtual simulation processor may be coupled to the 3D mapping processor to generate simulation video of a virtual aquarium comprising a plurality of fish and the 3D fish image, with the 3D fish image swimming within the virtual aquarium based on the predefined fish movements. A display may be used to display the simulation video of the virtual aquarium with the 3D fish image.

The fish image and the unique identifier may be printed on paper. The unique identifier may comprise a bar code or a QR code, for example.

The 2D fish image may include an outline of a fish with blank areas to be colored in by a viewer. The 3D mapping processor may then generate the 3D fish image as colored by the viewer. The fish image may further include a text bubble to also be filled in by the viewer. The virtual simulation processor may then generate the 3D fish image to include the filled in text bubble.

The interactive virtual aquarium simulation system advantageously allows a viewer to customize their 2D fish image. In the virtual aquarium, the corresponding 3D fish model may swim up to the viewer and introduce themselves based on the filled in text bubble.

The interactive virtual aquarium simulation system is adaptable and customizable in that the system may be scaled to fit a location as a stand alone attraction or as an integrated feature. As an alternative to fish images within a virtual aquarium, another embodiment of the present invention is directed to animal images within a virtual wildlife environment. For example, the animal images may be of a panda.

The virtual simulation processor may randomly select the predefined fish movements. The interactive virtual aquarium simulation system may further comprise a database coupled to the 3D mapping processor to store the 3D fish image, and a controller coupled to the virtual simulation processor to manually place the stored 3D fish image back into the simulation video.

The display may comprise a screen, and the interactive virtual aquarium simulation system may further comprise a projector coupled to the virtual simulation processor to project the simulation video onto the screen.

The interactive virtual aquarium simulation system may further comprise a 3D camera adjacent the display to generate 3D images of viewers in front of the display, and a 3D image processor coupled to the virtual simulation processor and to the 3D camera. The 3D image processor may determine a height of the viewers based on the 3D images and generate a viewer detect signal when a determined height is less than a height threshold. The virtual simulation processor may then move the 3D fish image towards the viewer based on the viewer detect signal.

Another aspect is directed to a method for operating an interactive virtual aquarium simulation system as described above. The method comprises scanning a 2D fish image and converting to a digital image, with the 2D fish image having a unique identifier associated therewith corresponding to predefined fish movements. A 3D fish image may be generated based on the digital image. Simulation video of a virtual aquarium comprising a plurality of fish and the 3D fish image may be generated, with the 3D fish image swimming within the virtual aquarium based on the set of predefined fish movements. The method may further comprise displaying the simulation video of the virtual aquarium with the 3D fish image.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
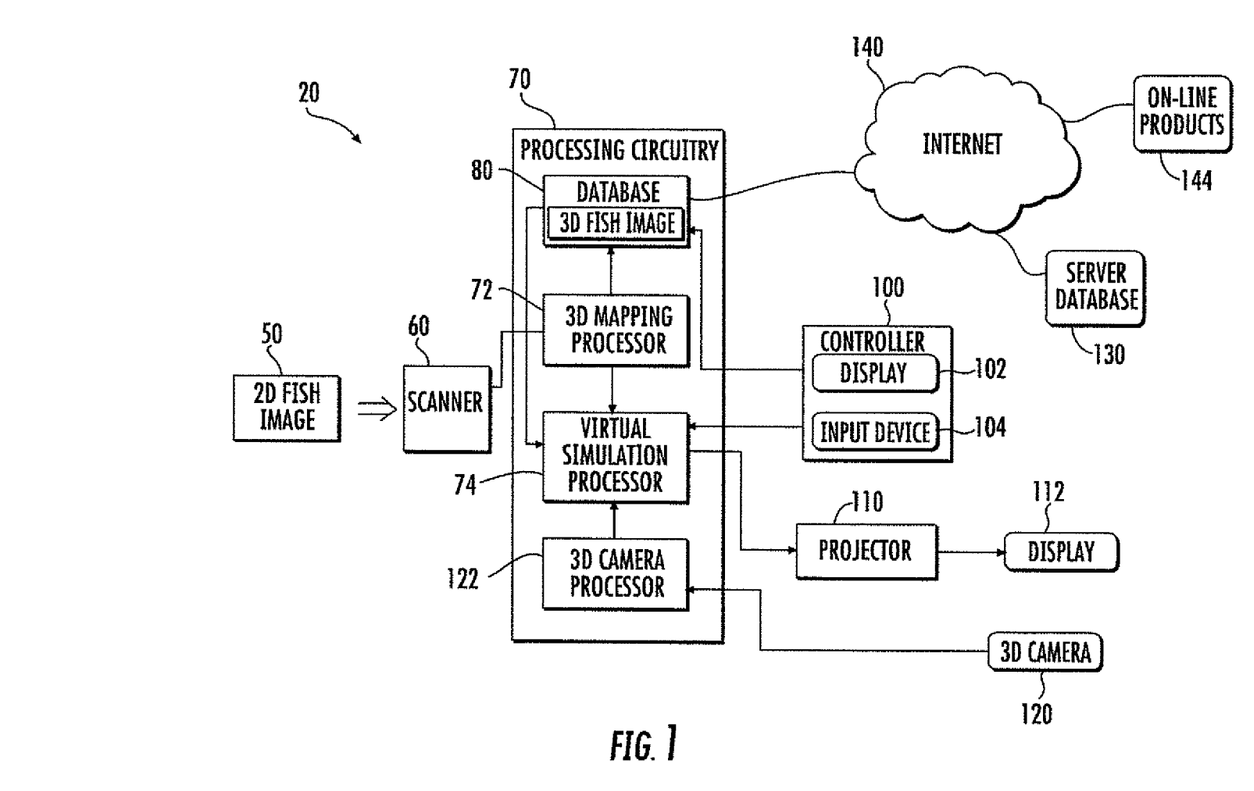
FIG. 1 is a block diagram of an interactive virtual aquarium simulation system in accordance with the present invention.
Figure 2:
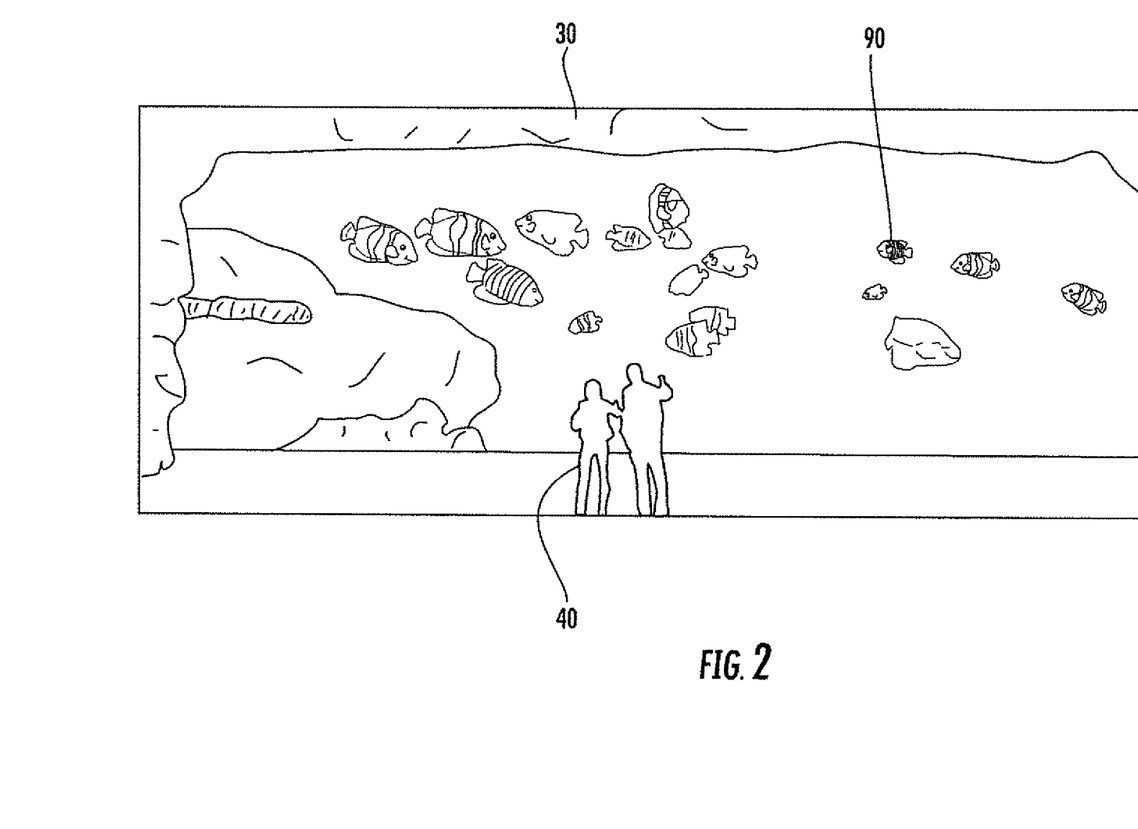
FIG. 2 is an image of the virtual aquarium generated by the interactive virtual aquarium simulation system illustrated in FIG. 1.

Referring initially to FIGS. 1-5, an interactive virtual aquarium simulation system 20 will be discussed. The interactive virtual aquarium simulation system 20 allows viewers to customize fish that will then be displayed within a virtual aquarium 30, as illustrated in FIG. 2. The viewers 40 are able to enjoy their creation in a fun and interactive way. The interactive virtual aquarium simulation system 20 is adaptable and customizable in that the system may be scaled to fit a location as a stand alone attraction or as an integrated feature.

Even though the illustrated simulation system 20 is directed to an underwater environment, the overall concept can mimic a variety of other type environments. For example, animals may be simulated in their natural environment.

Figure 3:
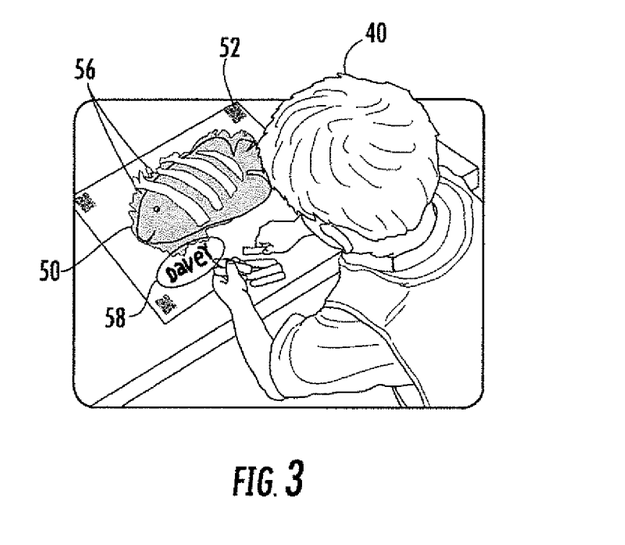
FIG. 3 is an image of a viewer customizing the 2D fish image illustrated in FIG. 1.

The interactive virtual aquarium simulation system 20 includes a two-dimensional (2D) fish image 50 to be customized by a viewer 40, with the fish image having a unique identifier 52 associated therewith, as illustrated in FIG. 3. The unique identifier 52 may be a bar code or QR code, for example, and identifies the fish as well as corresponding to a set of predefined fish movements. The fish image 50 is not limited to any particular type fish. In fact, underwater sea life other than fish, such as crustaceans, for example, may be used.

The viewer 40 customizing the fish image 50 will typically be a child. The fish image 50 and the unique identifier 52 are printed on paper 54. The unique identifier 52 is also used to link each particular viewer 40 to their customized fish image 50.

The illustrated fish image 50 includes an outline of a fish with blank areas 56 to be colored in by the viewer 40. The colors selected by the viewer 40 are used to customize the fish image 50. The fish image 50 further includes a text bubble 58 to be filled in by the viewer 40. The viewer 40 typically writes their name in the text bubble 58. In the illustrated example, the viewer's name is Davey and the text bubble 58 will be used by the viewer's customized fish in the virtual aquarium 30.

Figure 4:
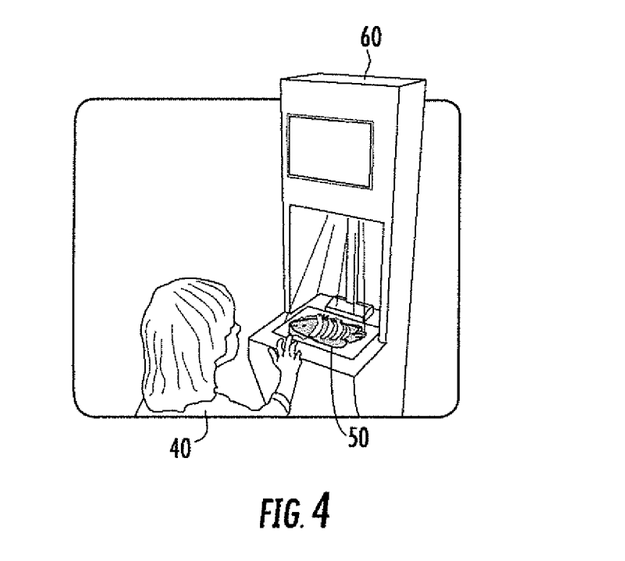
FIG. 4 is an image of a customized 2D fish image being scanned by the scanner illustrated in FIG. 1.

A scanner 60 is used to scan the customized 2D fish image 50 and convert to a digital image. The scanner 60 optically scans the fish image 50, the text bubble 58 and the unique identifier 52 to convert to the digital image. The scanner 60 may be configured as a kiosk, for example, as illustrated in FIG. 3. In the illustrated embodiment the viewer 40 is operating the scanner 60. After scanning, the viewer 40 may keep their customized fish image 50 as a souvenir.

The scanner 60 is coupled to processing circuitry 70. The illustrated processing circuitry 70 includes a three-dimensional (3D) mapping processor 72 and a virtual simulation processor 74. The digital image from the scanner 60 is received by the 3D mapping processor 72.

The 3D mapping processor 72 maps the 2D fish image 50 to a customized 3D fish image. The digital image received by the 3D mapping processor 72 is called a UV texture map. The UV texture map of the fish image 50 is projected onto a 3D fish image.

The letters U and V denote the axes of the 2D texture map since letters X, Y and Z are already used to denote the axes of the 3D fish image in model space. UV texturing permits polygons that make up a 3D object to be painted with color from an image. The UV mapping process involves assigning pixels in the image to surface mappings on the polygon, usually done by programmatically copying a triangle shaped piece of the image map and pasting it onto a triangle on the object. UV maps into a texture space rather than into the geometric space of the object, but the rendering computation by the 3D mapping processor 72 uses the UV texture coordinates to determine how to paint the 3D surface.

Figure 5:
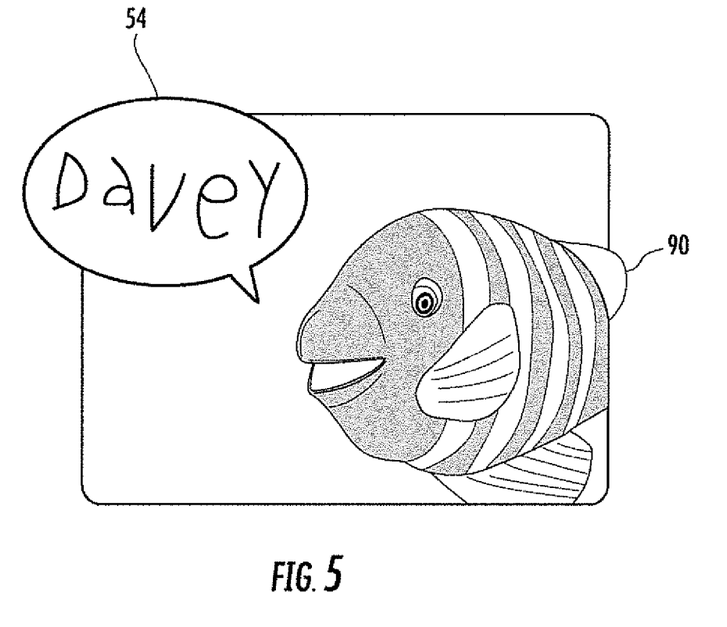
FIG. 5 is an image of a customized 3D fish image as provided by the virtual simulation processor illustrated in FIG. 1.

The customized 3D fish image generated by the 3D mapping processor 72 is provided to the virtual simulation processor 74. The virtual simulation processor 74 executes software to generate simulation video of the virtual aquarium 30 comprising a plurality of fish. The virtual aquarium 30 also includes the 3D fish image 90, as illustrated in FIG. 5. The virtual simulation processor 74 causes the 3D fish image 90 to swim within the virtual aquarium 30 based on the set of predefined fish movements. The unique identifier 52 associated with the fish image 50 is linked to the set of predefined fish movements accessed by the virtual simulation processor 74, and the unique identifier 52 remains linked to the 3D fish image 90 so as to uniquely identify the viewer that customized the initial 2D fish image 50.

The 3D fish image 90 may be placed in the virtual aquarium 30 by the virtual simulation processor 74 as if being dropped into the water from above. One of the predefined fish movements is for the 3D fish image 90 to swim to the front of the display and introduce themselves by momentarily displaying the text bubble 54 as filled in by the viewer that customized the initial 2D fish image 50.

The virtual simulation processor 74 may be configured to randomly select the predefined fish movements. The predefined fish movements may be based on artificial intelligence. For example, if a shark moves near the 3D fish image 90 then the 3D fish image swims away. Other movements may include the 3D fish image 90 stopping and waving to the viewer 40, falling asleep and chasing its tail. The 3D fish image 90 appears in the virtual aquarium 30 for a predetermined amount of time.

The simulation video of the virtual aquarium 30 as generated by the virtual simulation processor 74 is provided to a projector 110. The projector 110 projects the simulation video onto a display 112, which may be a screen, for example. The simulation video may be forward or backward projected onto the screen 112. As an alternative to the projector 110 and screen 112 arrangement, the simulation video is provided directly to the display 112, which may be configured as a TV monitor.

Each 3D fish image 90 generated by the virtual simulation processor 74 is also stored in a database 80. The database 80 allows the 3D fish image 90 to be retrieved and dropped back into the virtual aquarium 30 if necessary. For example, if a viewer 40 did not see their 3D fish image 90, which is displayed for a predetermined period of time, or wants to see it again, then their 3D fish image is retrieved from the database 80. A controller 100 is coupled to the processing circuitry 70 and is used to re-drop the 3D fish image 90 into the virtual aquarium 30. The controller 100 includes a display 102 and an input device 104. The input device 104 may be a keyboard, for example. Icons, for example, of recently generated 3D fish images 90 appear on the display 102, and an operator of the controller 100 selects the desired image via the input device 104.

A 3D camera 120 is adjacent the display 112 to generate 3D images of viewers 40 in front of the display. A 3D image processor 122 is coupled to the 3D camera 120 to generate a viewer detect signal based on the 3D images. The viewer detect signal is generated when a determined height of a viewer is less than a height threshold. The height threshold may be 52 inches or less, for example, so as to correspond to a child's height.

The 3D image processor 122 is included within the processing circuitry 70. The 3D image processor 122 is coupled to the virtual simulation processor 74. When a child is detected, as indicated by the viewer detect signal, the virtual simulation processor 74 then directs the 3D fish image 90 to swim toward the child.

Figure 6:
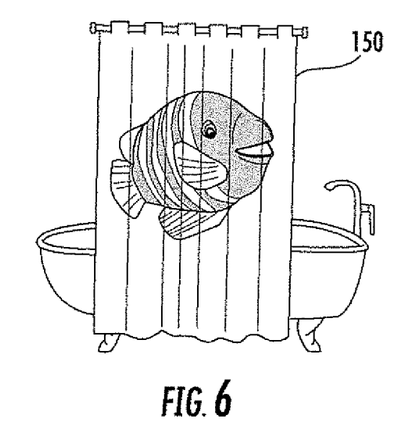
FIGS. 6-8 are images of on-line products with the customized 3D fish image as provided by the virtual simulation processor illustrated in FIG. 1.
Figure 7:
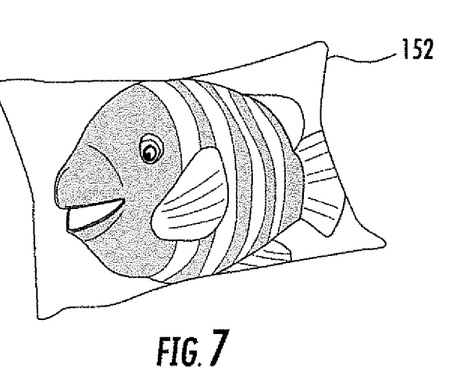
Figure 8:
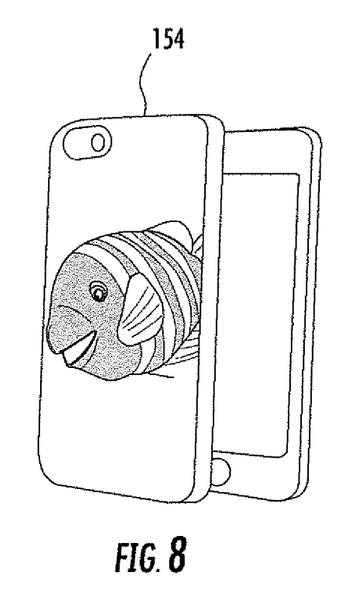

The 3D fish images 90 are also provided to a server database 130. The server database 130 is coupled to the Internet 140. This allows viewers to order items or products 144 that have their customized 3D fish image printed thereon. For example, the available items or products may be a shower curtain 150, a pillow case 152 and a case 154 for a cell phone, as illustrated in FIGS. 6-8.

Figure 9:
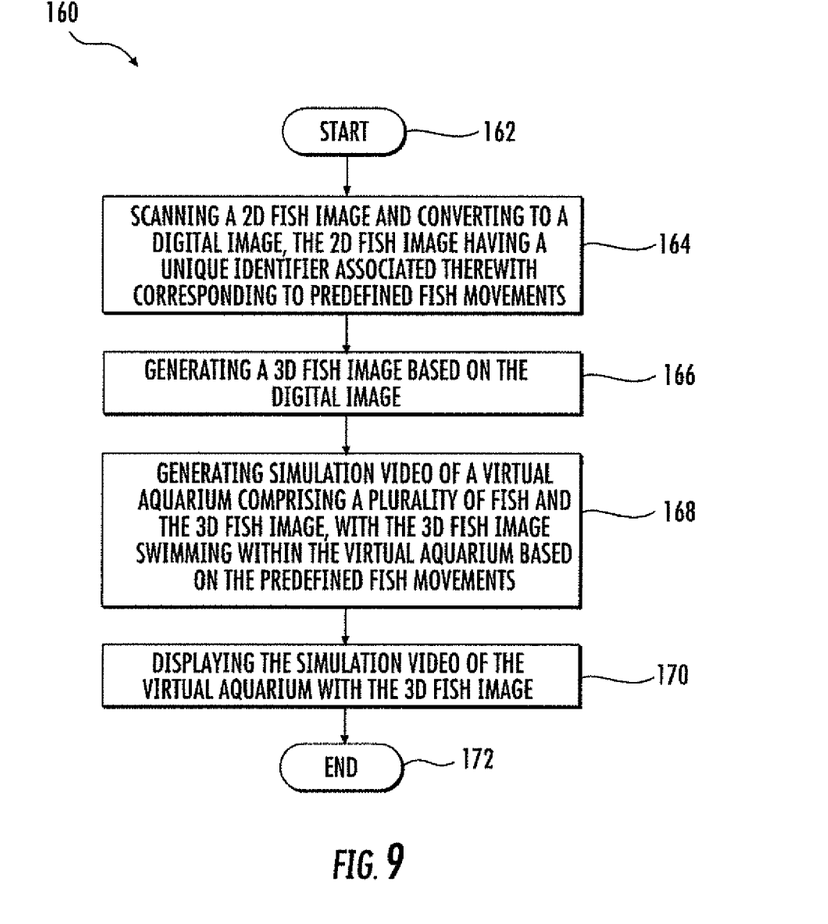
FIG. 9 is a flowchart illustrating a method for operating the interactive virtual aquarium simulation system illustrated in FIG. 1.

Another aspect is directed to a method for operating the interactive virtual aquarium simulation system 20 as described above. Referring now to the flowchart 160 illustrated in FIG. 9, the method comprises, from the start (Block 162), scanning a 2D fish image 50 and converting to a digital image at Block 164, with the 2D fish image having a unique identifier 52 associated therewith corresponding to predefined fish movements. A 3D fish image 90 is generated based on the digital image at Block 166. Simulation video of a virtual aquarium 30 comprising a plurality of fish and the 3D fish image 90 is generated at Block 168, with the 3D fish image swimming within the virtual aquarium based on the set of predefined fish movements. The simulation video of the virtual aquarium 30 with the 3D fish image 90 is displayed at Block 170. The method ends at Block 172.

Figure 10:
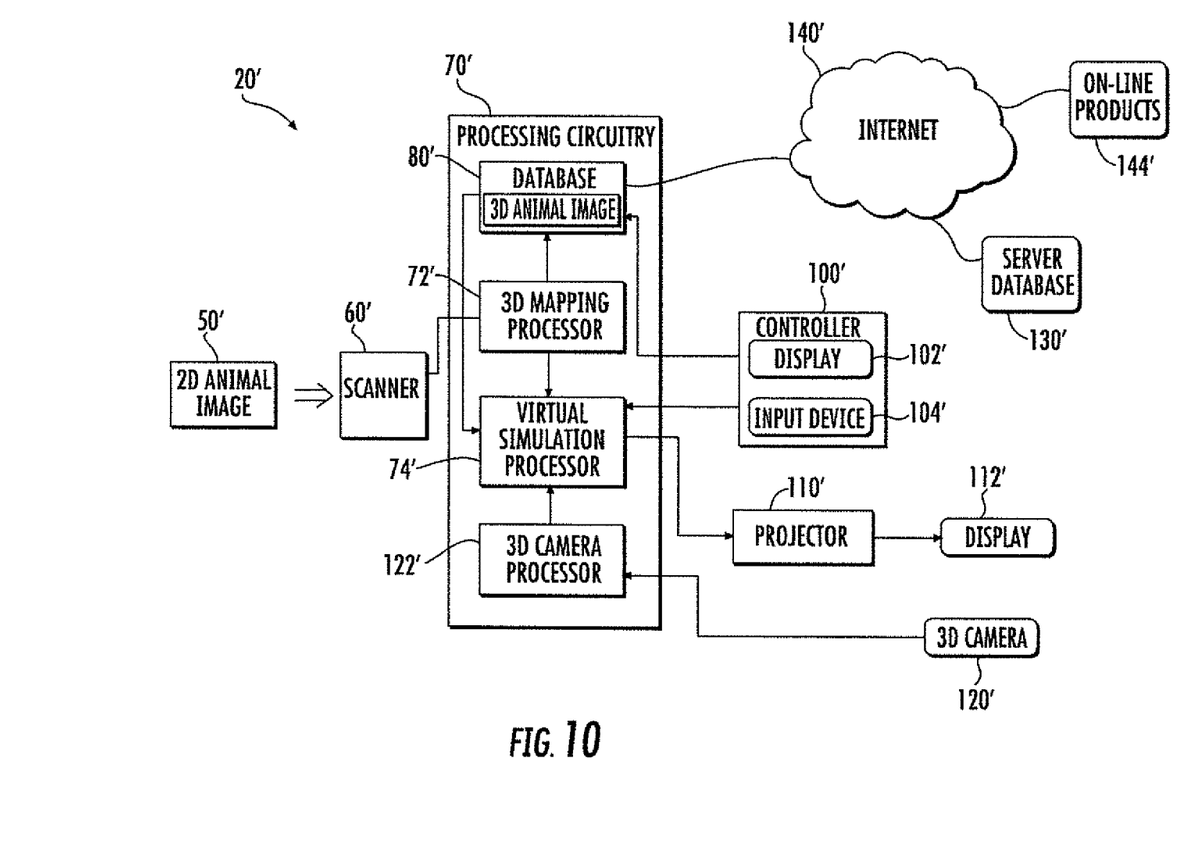
FIG. 10 is a block diagram of an interactive virtual wildlife simulation system in accordance with the present invention.
Figure 11:
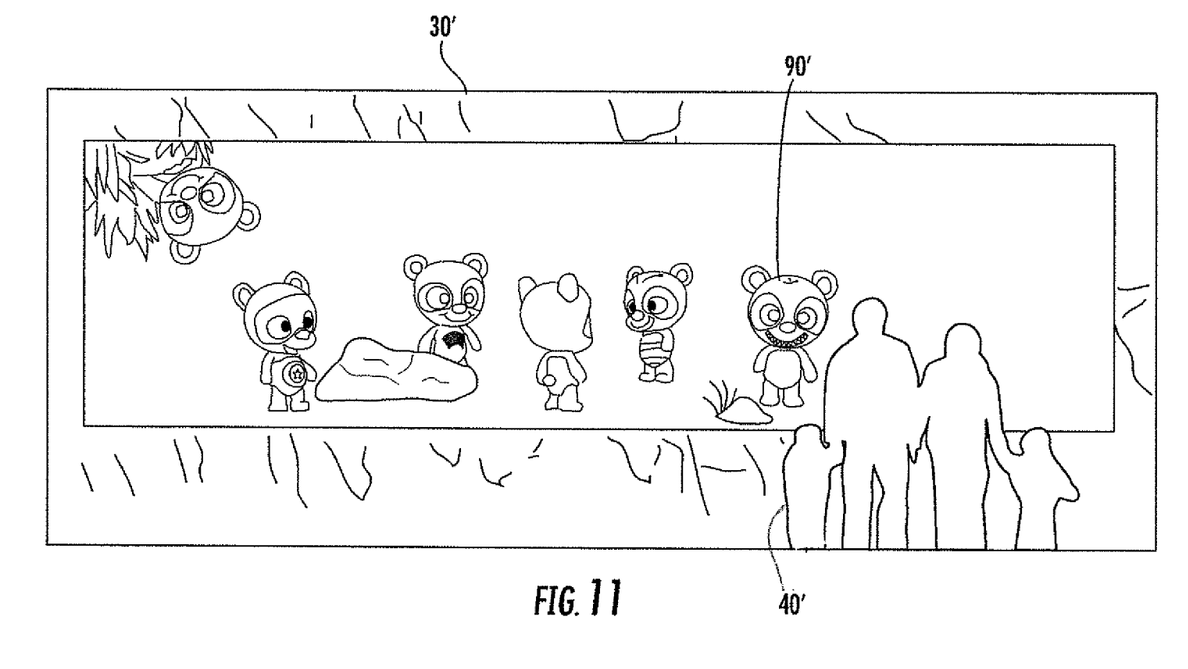
FIG. 11 is an image of the virtual wildlife environment generated by the interactive virtual wildlife simulation system illustrated in FIG. 10.
Figure 12:
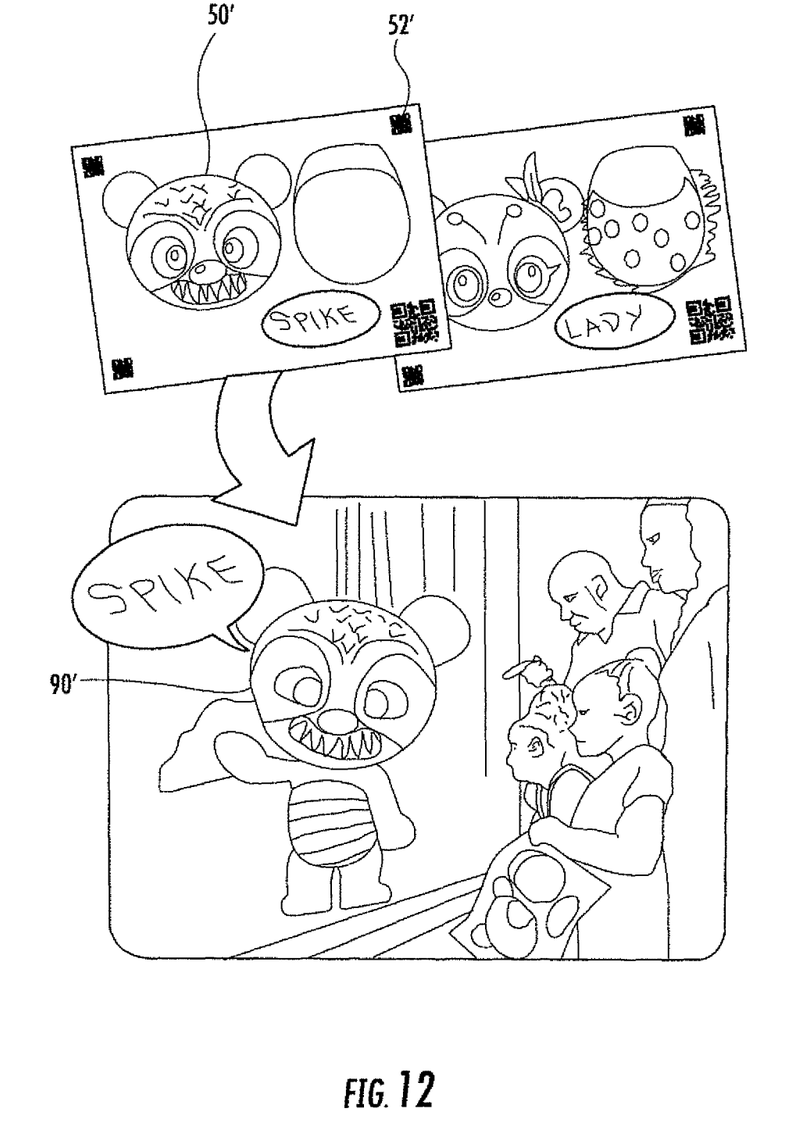
FIG. 12 is an image of a customized 2D animal image, and the corresponding 3D animal image within the virtual wildlife environment illustrated in FIG. 11.

As an alternative to fish images within a virtual aquarium, another embodiment of the present invention is directed to an interactive virtual wildlife simulation system 20', as illustrated in FIGS. 10-12. The interactive virtual wildlife simulation system 20' allows viewers to customize an animal that will then be displayed within a virtual wildlife environment 30', as illustrated in FIG. 11. In the illustrated example, the 3D animal image 90' is a panda. The panda is an example and other types of animals may be used.

The interactive virtual wildlife simulation system 20' includes a two-dimensional (2D) animal image 50' having a unique identifier 52' associated therewith. The unique identifier 52' corresponds to predefined animal movements. A scanner 60' is to scan the 2D animal image 50' and convert to a digital image. A three-dimensional (3D) mapping processor 72' is coupled to the scanner 60' to generate a 3D animal image 90' based on the digital image. A virtual simulation processor 74' is coupled to the 3D mapping processor 72' to generate simulation video of a virtual wildlife environment 30' comprising the 3D animal image 90', with the 3D animal image moving within the virtual wildlife environment based on the predefined animal movements. A display 112' is to display the simulation video of the virtual wildlife environment 30' with the 3D animal image 90'.

The 2D animal image 50', similar to the 2D fish image 50 as described above, is customized by a viewer, as illustrated in FIG. 12. When the 3D animal image 90' is placed within the virtual wildlife environment 30', it walks to the front of the display 112' to introduce themselves to viewers. This is part of the predefined animal movements corresponding to the unique identified 52' that is associated with the animal image 50'.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included herein.

That which is claimed is:

1. An interactive virtual aquarium simulation system comprising:
    a two-dimensional (2D) fish image having a unique identifier and a text bubble associated therewith, with the unique identifier identifying a type of fish and identifying a set of predefined fish movements, and with the text bubble to be filled in by a viewer;
    an optical scanner to simultaneously scan the 2D fish image, the unique identifier, and the text bubble, and convert the 2D fish image to a digital image;
    a three-dimensional (3D) mapping processor coupled to said scanner to generate a 3D fish image based on the digital image;
    a virtual simulation processor coupled to said 3D mapping processor to generate simulation video of a virtual aquarium comprising a plurality of fish and the 3D fish image, with the 3D fish image swimming within the virtual aquarium based on the set of predefined fish movements; and
    a display to display the simulation video of the virtual aquarium with the 3D fish image;
    wherein the set of predefined fish movements includes the 3D fish image swimming to a front of said display while said virtual simulation processor momentarily displays the text bubble as filled in by the viewer.

2. The interactive virtual aquarium simulation system according to claim 1 wherein the fish image and the unique identifier are printed on paper.

3. The interactive virtual aquarium simulation system according to claim 1 wherein the unique identifier comprises at least one of a bar code and a QR code.

4. The interactive virtual aquarium simulation system according to claim 1 wherein the 2D fish image includes an outline of a fish with blank areas to be colored in by a viewer; and wherein said 3D mapping processor generates the 3D fish image as colored by the viewer.

5. The interactive virtual aquarium simulation system according to claim 1 wherein said virtual simulation processor randomly selects the predefined fish movements.

6. The interactive virtual aquarium simulation system according to claim 1 further comprising a database coupled to said 3D mapping processor to store the 3D fish image.

7. The interactive virtual aquarium simulation system according to claim 6 further comprising a controller coupled to said virtual simulation processor to manually place the stored 3D fish image back into the simulation video.

8. The interactive virtual aquarium simulation system according to claim 1 wherein said display comprises a screen; and further comprising a projector coupled to said virtual simulation processor to project the simulation video onto said screen.

9. The interactive virtual aquarium simulation system according to claim 1 further comprising:
   a 3D camera adjacent said display to generate 3D images of viewers in front of said display; and
   a 3D image processor coupled to said virtual simulation processor and to said 3D camera, said 3D image processor to determine a height of the viewers based on the 3D images and to generate a viewer detect signal when a determined height is less than a threshold;
   wherein said virtual simulation processor moves the 3D fish image towards the viewer based on the viewer detect signal.

10. A method for operating an interactive virtual aquarium simulation system comprising:
    optically scanning a 2D fish image, and a unique identifier and a text bubble associated therewith and converting the 2D fish image to a digital image, with the unique identifier identifying a type of fish and identifying a set of a set of predefined fish movements and being simultaneously scanned with the 2D fish image, and with the text bubble to be filled in by a viewer;
    generating a 3D fish image based on the digital image;
    generating simulation video of a virtual aquarium comprising a plurality of fish and the 3D fish image, with the 3D fish image swimming within the virtual aquarium based on the set of predefined fish movements; and
    displaying the simulation video of the virtual aquarium with the 3D fish image;
    wherein the set of predefined fish movements includes the 3D fish image swimming to a front of a display while momentarily displaying the text bubble as filled in by the viewer.

11. The method according to claim 10 wherein the fish image and the unique identifier are printed on paper.

12. The method according to claim 10 wherein the unique identifier comprises at least one of a bar code and a QR code.

13. The method according to claim 10 wherein the fish image further includes a text bubble to be filled in by a viewer; and the 3D fish image is generated to include the filled in text bubble.

14. The method according to claim 10 wherein the predefined fish movements are randomly selected.

15. The method according to claim 10 further comprising storing the 3D fish image in a database.

16. The method according to claim 15 further comprising manually placing the stored 3D fish image back into the simulation video.

17. The method according to claim 10 wherein the simulation video is displayed on a display, and the interactive virtual aquarium simulation system comprises a 3D camera adjacent the display and a 3D image processor, the method comprising:
    operating the 3D camera to generate 3D images of viewers in front of the display; and
    operating the 3D image processor to determine a height of the viewers based on the 3D images and to generate a viewer detect signal when a determined height is less than a threshold;
    wherein generating the virtual simulation comprises moving the 3D fish image towards the viewer based on the viewer detect signal.

18. An interactive virtual wildlife simulation system comprising:
    a two-dimensional (2D) animal image having a unique identifier and a text bubble associated therewith, with the unique identifier identifying a type of animal and identifying a set of predefined animal movements, and with the text bubble to be filled in by a viewer;
    an optical scanner to simultaneously scan the 2D animal image, the unique identifier, and the text bubble, and convert the 2D fish image to a digital image;
    a three-dimensional (3D) mapping processor coupled to said scanner to generate a 3D animal image based on the digital image;
    a virtual simulation processor coupled to said 3D mapping processor to generate simulation video of a virtual wildlife environment comprising the 3D animal image, with the 3D animal image moving within the virtual wildlife environment based on the set of predefined animal movements; and
    a display to display the simulation video of the virtual wildlife environment with the 3D animal image;
    wherein the set of predefined animal movements includes the 3D animal image moving to a front of said display while said virtual simulation processor momentarily displays the text bubble as filled in by the viewer.

19. The interactive virtual wildlife simulation system according to claim 18 wherein the animal image and the unique identifier are printed on paper.

20. The interactive virtual wildlife simulation system according to claim 18 wherein the unique identifier comprises at least one of a bar code and a QR code.

21. The interactive virtual wildlife simulation system according to claim 18 wherein the 2D animal image includes an outline of an animal with blank areas to be colored in by a viewer; and wherein said 3D mapping processor generates the 3D animal image as colored by the viewer.

22. The interactive virtual wildlife simulation system according to claim 18 wherein said virtual simulation processor randomly selects the predefined animal movements.

23. The interactive virtual wildlife simulation system according to claim 18 further comprising a database coupled to said 3D mapping processor to store the 3D animal image.

24. The interactive virtual wildlife simulation system according to claim 23 further comprising a controller coupled to said virtual simulation processor to manually place the 3D animal image back into the simulation video.

* * * * *